(12) United States Patent
Grewal et al.

(10) Patent No.: US 11,136,129 B2
(45) Date of Patent: Oct. 5, 2021

(54) SEAT TRACK FITTINGS AND METHODS FOR INSTALLING PASSENGER SEATS IN AIRCRAFT CABINS USING SEAT TRACK FITTINGS

(71) Applicant: The Boeing Company, Chicago, IL (US)

(72) Inventors: Gagandeep Inder Singh Grewal, Bothell, WA (US); Jason B. Kim, Edmonds, WA (US); Angela Natale, Seattle, WA (US)

(73) Assignee: The Boeing Company, Chicago, IL (US)

( * ) Notice: Subject to any disclaimer, the term of this patent is extended or adjusted under 35 U.S.C. 154(b) by 94 days.

(21) Appl. No.: 16/404,977

(22) Filed: May 7, 2019

(65) Prior Publication Data

US 2020/0354065 A1 Nov. 12, 2020

(51) Int. Cl.
*B64D 9/00* (2006.01)
*B64D 11/06* (2006.01)
*B64F 5/10* (2017.01)

(52) U.S. Cl.
CPC ............ *B64D 11/0696* (2013.01); *B64F 5/10* (2017.01)

(58) Field of Classification Search
CPC ... B64D 11/0696; B64F 5/10; B60N 2/01516; B60N 2/01525; B60N 2/01575; B60N 2/0818
See application file for complete search history.

(56) References Cited

U.S. PATENT DOCUMENTS

| | | | |
|---|---|---|---|
| 5,823,727 A | * | 10/1998 | Lee .................. F16B 37/045 411/85 |
| 8,191,829 B2 | | 6/2012 | Erickson et al. |
| 8,444,359 B2 | | 5/2013 | Grether et al. |
| 10,190,615 B2 | * | 1/2019 | McClure .............. F16B 13/045 |
| 2010/0116933 A1 | * | 5/2010 | Erickson ........... B64D 11/0696 244/118.5 |

* cited by examiner

*Primary Examiner* — Jun S Yoo
(74) *Attorney, Agent, or Firm* — Kwan & Olynick LLP

(57) ABSTRACT

Provided are seat track fittings and methods for installing passenger seats in aircraft cabins using these seat track fittings such that the same seat can be installed on different types of seat tracks. A seat track fitting comprises a leg support, a pin, and a base interconnecting the leg support and pin. During installation of the seat track fitting, the pin is inserted into an attachment opening of the seat track. The attachment opening is selected based on the desired position of a seat. A removable fastener then protrudes through the base of the seat track fitting and is inserted into another attachment opening of the seat track. The seat is then attached to the seat track fitting by inserting the stud end of the seat into the leg support of the seat track fitting and fixing the stud end within the leg support.

24 Claims, 10 Drawing Sheets

SEAT TRACK FITTINGS AND METHODS FOR INSTALLING PASSENGER SEATS IN AIRCRAFT CABINS USING SEAT TRACK FITTINGS

BACKGROUND

A typical passenger aircraft is equipped with seats for passengers to occupy during flight. These seats are typically on seat tracks extending through the aircraft cabin. The seats are arranged in rows and aisles, with specific seat pitches determining the space between two adjacent rows. The seat tracks may have multiple attachment points allowing different seats arrangements in the cabin. For example, the seat pitch (SP) may be adjusted by moving the seats along the tracks and attaching the seats to new attachment points on the tracks. Changing the seat pitch allows increasing or decreasing the aircraft capacity and leg room (e.g., to address seasonal and route demand fluctuations). As such, airlines and other aircraft operators are often interested in being able to reconfigure an aircraft cabin in a fast and efficient manner. However, adding seats to aircraft or, more specifically, stocking correct types of seats, can be challenging due to different configurations of seat tracks and seats used in different aircraft. A typical airline may operate many different makes and models of aircraft using different seats and seat tracks. At the same time, an airline may be interested in reconfiguring aircraft cabins at different locations (e.g., at multiple hubs or even airports). Managing stocks of different types of seats (e.g., at different locations where reconfigurations may occur) and matching these seats to specific seat tracks can be very challenging.

What is needed are seat track fittings and methods for installing passenger seats in aircraft cabins using these seat track fittings such that the same seat can be installed on different types of seat tracks, in one case using seat track fittings and in another case without seat track fittings.

SUMMARY

Provided are seat track fittings and methods for installing passenger seats in aircraft cabins using these seat track fittings such that the same seat can be installed on different types of seat tracks. A seat track fitting comprises a leg support, a pin, and a base interconnecting the leg support and pin. During installation of the seat track fitting, the pin is inserted into an attachment opening of the seat track. The attachment opening is selected based on the desired position of a seat. A removable fastener then protrudes through the base of the seat track fitting and is inserted into another attachment opening of the seat track. The seat is then attached to the seat track fitting by inserting the stud end of the seat into the leg support of the seat track fitting and fixing the stud end within the leg support.

Illustrative, non-exclusive examples of inventive features according to present disclosure are described in following enumerated paragraphs:

A1. Method 300 for installing seat 110 on seat track 190 in an aircraft cabin, method 300 comprising:
providing seat track fitting 200, having first axis 201 and comprising base 210, leg support 230, and pin 270, wherein:
base 210 comprises first planar surface 211, second planar surface 212, and base opening 215;
leg support 230 comprises first leg support portion 240 and second leg support portion 250, forming channel 260 over first planar surface 211 of base 210 and comprising support opening 263; and
pin 270 is monolithic with base 210 and extends from second planar surface 212 away from leg support 230;
inserting pin 270 of seat track fitting 200 into first attachment opening 193 of seat track 190; and
installing removable fastener 290 through second attachment opening 194 of seat track 190 and through base opening 215 of seat track fitting 200, wherein removable fastener 290 forces second planar surface 212 of base 210 of seat track fitting 200 toward track support 192 of seat track 190.

A2. Method 300 of paragraph A1, wherein support opening 263 comprises first semicircular portion 264, concentric with base opening 215, and wherein installing removable fastener 290 comprises protruding removable fastener 290 through first semicircular portion 264, base opening 215, and second attachment opening 194 and tightening fastener nut 292 of removable fastener 290 against first planar surface 211.

A3. Method 300 of paragraph A2, wherein tightening fastener nut 292 against first planar surface 211 comprises flaring end 294 of removable fastener 290 inside track channel 199 of seat track 190.

A4. Method 300 of paragraph A2, wherein at least a portion of fastener nut 292 is positioned within channel 260.

A5. Method 300 of any one of paragraphs A1-A4, further comprising attaching seat 110 to seat track fitting 200, supported on seat track 190.

A6. Method 300 of paragraph A5, wherein attaching seat 110 to seat track fitting 200 comprises:
protruding stud end 115 of seat 110 into channel 260;
sliding seat 110 along first axis 201 of seat track fitting 200;
rotating stud nut 116 of seat 110 relative to stud 114, connecting stud end 115 and leg 112 of seat 110; and
tightening stud nut 116 against first lip 244 of first leg support portion 240 and second lip 254 of second leg support portion 250, wherein first lip 244 and second lip 254 are disposed and tightened between stud nut 116 and stud end 115.

A7. Method 300 of paragraph A6, wherein support opening 263 comprises second semicircular portion 265, and wherein stud end 115 is protruded into channel 260 through second semicircular portion 265.

A8. Method 300 of paragraph A7, wherein support opening 263 comprises linear portion 266 defined by first linear part 246 of first inner lip edge 245 of first lip 244 and by second linear part 256 of second inner lip edge 255 of second lip 254, and wherein, after sliding seat 110 along first axis 201, stud 114 protrudes through linear portion 266.

A9. Method 300 of paragraph A6, wherein sliding seat 110 along first axis 201 comprising sliding stud end 115 within channel 260 in a direction away from removable fastener 290.

A10. Method 300 of any one of paragraphs A1-A9, further comprising removing removable fastener 290 from second attachment opening 194 of seat track 190 and through base opening 215 of seat track fitting 200 and removing seat track fitting 200 from seat track 190.

B1. Seat track fitting 200 having first axis 201, second axis 202, and third axis 203, wherein first axis 201 is perpendicular to second axis 202 and to third axis 203 and wherein second axis 202 is perpendicular to third axis 203, seat track fitting 200 comprising:
base 210, comprising first planar surface 211, second planar surface 212, and base opening 215, wherein:

first planar surface 211 is parallel to second planar surface 212 and contains first axis 201 and second axis 202 of seat track fitting 200;

first planar surface 211 is offset relative to second planar surface 212 along third axis 203 of seat track fitting 200; and base opening 215 extends between first planar surface 211 and second planar surface 212 and is centered relative to third axis 203 of seat track fitting 200;

leg support 230, comprising first leg support portion 240 and second leg support portion 250, forming channel 260 over first planar surface 211 of base 210 and extending along first axis 201, wherein:

first leg support portion 240 comprises first lip 244 and first wall 242, monolithic with and connecting first lip 244 to base 210;

second leg support portion 250 comprises second lip 254 and second wall 252, monolithic with and connecting second lip 254 to base 210;

channel 260 comprises first channel portion 261, second channel portion 262, and support opening 263;

first channel portion 261 is positioned between first lip 244 and second lip 254 along second axis 202;

second channel portion 262 is positioned between first wall 242 and second wall 252 along second axis 202 and also between first channel portion 261 and first planar surface 211 along third axis 203;

support opening 263 is defined by first inner lip edge 245 of first lip 244 and second inner lip edge 255 of second lip 254 and is a part of the boundary of first channel portion 261; and pin 270, monolithic with base 210 and extending from second planar surface 212 along second axis 202.

B2. Seat track fitting 200 of paragraph B1, wherein a center distance (L1) between pin 270 and base opening 215 is equal to double of a seat track pitch (P).

B3. Seat track fitting 200 of any one of paragraph B1-B2, wherein support opening 263 comprises first semicircular portion 264 and second semicircular portion 265, and wherein first semicircular portion 264 is concentric with base opening 215.

B4. Seat track fitting 200 of paragraph 133, wherein support opening 263 comprises linear portion 266 defined by first linear part 246 of first inner lip edge 245 of first lip 244 and by second linear part 256 of second inner lip edge 255 of second lip 254, and wherein first linear part 246 and second linear part 256 are both parallel to first axis 201.

B5. Seat track fitting 200 of paragraph 134, wherein linear portion 266 has a width (W1) less than a diameter (D1) of second semicircular portion 265, and wherein linear portion 266 has a length (L2) greater than the diameter (D1) of second semicircular portion 265.

B6. Seat track fitting 200 of paragraph B4, wherein second semicircular portion 265 is positioned between first semicircular portion 264 and linear portion 266 along first axis 201.

B7. Seat track fitting 200 of any one of paragraphs B1-B6, wherein first wall 242 comprises first inner curved wall 243, and wherein second wall 252 comprises second inner curved wall 253, defining, together with first inner curved wall 243, first planar surface 211, first channel portion 261, and the boundary of second channel portion 262.

B8. Seat track fitting 200 of paragraph B7, wherein the shapes of first inner curved wall 243 and second inner curved wall 253 are conformal to the shape of stud end 115 of seat 110.

B9. Seat track fitting 200 of paragraph B7, wherein first inner curved wall 243 and second inner curved wall 253 are both parallel to first axis 201.

B10. Seat track fitting 200 of any one of paragraphs B1-B9, wherein first leg support portion 240 and second leg support portion 250 are symmetrical relative to virtual plane 205 containing first axis 201 and third axis 203.

B11. Seat track fitting 200 of any one of paragraphs B1-B10, wherein opening 263 is parallel to first planar surface 211.

B12. Seat track fitting 200 of any one of paragraphs B1-B11, wherein the average width of first channel portion 261, along second axis 202, is less than the average width of second channel portion 262.

B13. Seat track fitting 200 of any one of paragraphs B1-B12, wherein the maximum width of first channel portion 261, along second axis 202, is equal to the maximum width of second channel portion 262.

B14. Seat track fitting 200 of any one of paragraphs B1-B13, wherein first channel portion 261 and second channel portion 262 both extend, along first axis 201, the entire length of seat track fitting 200.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Different makes and/or models of aircraft often use different types of seat tracks. This diversity complicates the process of reconfiguring aircraft cabins and, in particular, managing seat inventories. For example, different seat types are conventionally needed to accommodate different track types. At the same time, airlines would like to make this process of reconfiguring cabins seamless, regardless of the aircraft type, and available at multiple locations. Seat track fittings, described herein, provide an option for attaching the same type of seats to different types of seat tracks.

Figure 1A:
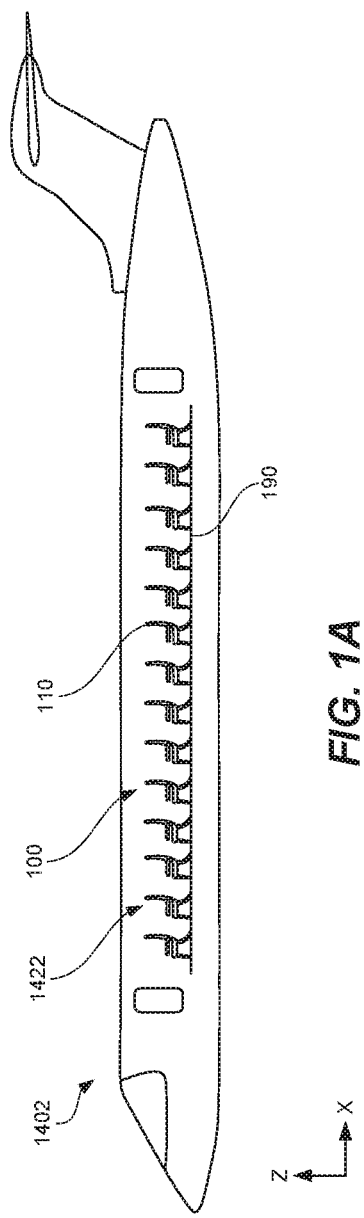
FIG. 1A is a schematic side cross-sectional view of a passenger aircraft, comprising a cabin and passenger seats, positioned within the cabin and supported on a seat track.
Figure 6:
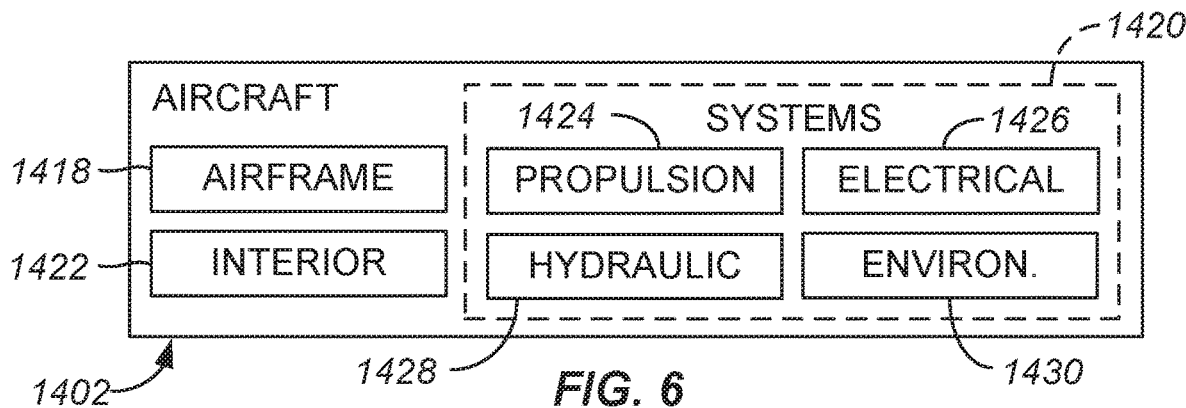
FIG. 6 illustrates a block diagram of an example of an aircraft, in accordance with some examples.

Aircraft, cabins, seats, and seat tracks will now be briefly described with reference to FIGS. 1A-1G to provide some context. FIG. 1A is a schematic side cross-sectional view of aircraft 1402. Aircraft 1402 comprises cabin 100, which is a part of interior 1422 of aircraft 1402. Additional details of aircraft 1402 and interior 1422 are described below with reference to FIG. 6. Seats 110 are positioned inside cabin 100 and supported on seat track 190.

Figure 1B:
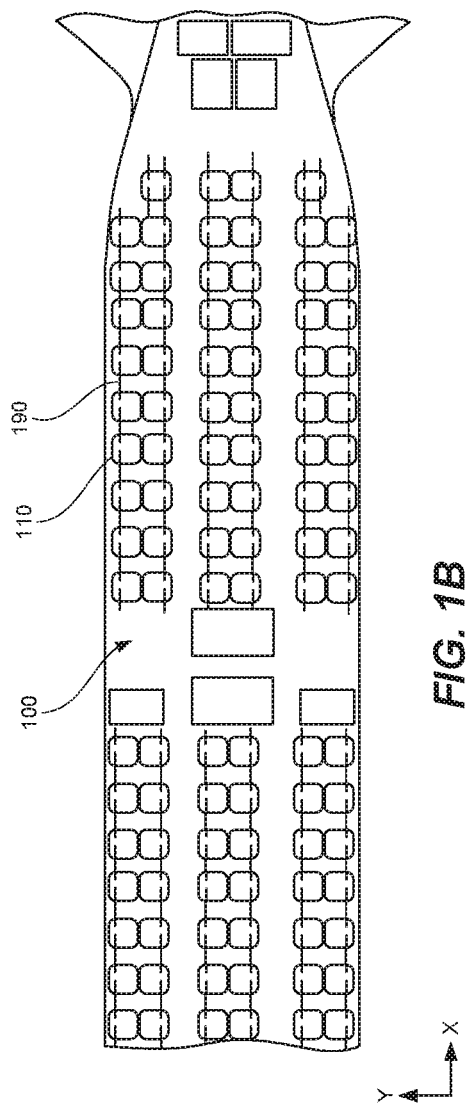
FIG. 1B is a schematic top cross-sectional view inside the cabin of the passenger aircraft, illustrating arrangement of the passenger seats and seat tracks.
Figure 1C:
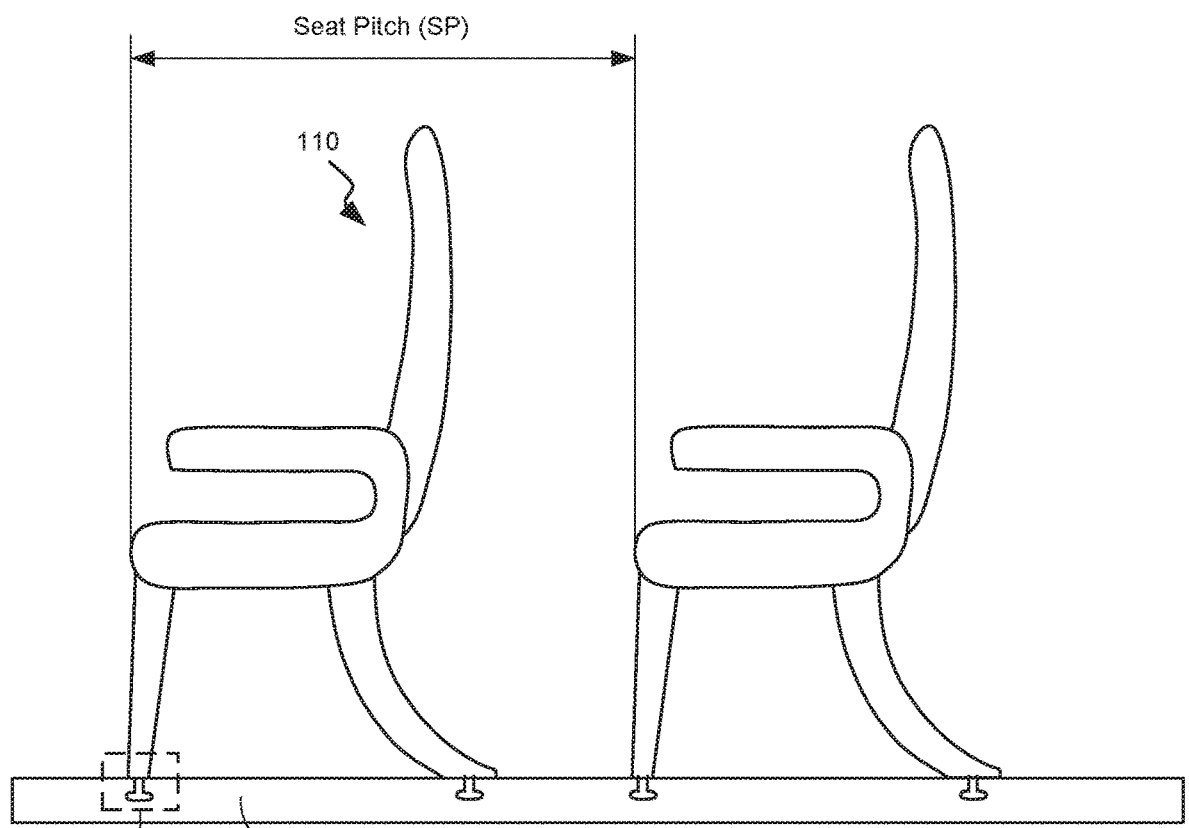
FIG. 1C illustrates two adjacent passenger seats supported on a seat track, in accordance with some examples.

FIG. 1B is a schematic top cross-sectional view inside cabin 100, illustrating arrangement of seats 110 and seat tracks 190. Specifically, seats 110 are arranged in rows (along the Y direction) and aisles (along the X direction). It should be noted that the X, Y, and Z directions shown in FIGS. 1A and 1B are parallel to corresponding axes of seat track fittings, which are described below. The X axis also corresponds to the longitudinal axis or the roll axis of aircraft 1402. The Y axis corresponds to the lateral axis or the pitch axis. Finally, the Z axis also corresponds to the vertical axis or the yaw axis. Each set of seats 110, which may include one of more seats, is supported using at least two seat tracks 190. Seat tracks 190 extend in the X direction and allow changing the space between adjacent rows of seats 110. This space is determined by a seat pitch (SP), which is schematically shown in FIG. 1C. The seat pitch can be changed by moving one or both adjacent seats along seat track 190.

Figure 1D:
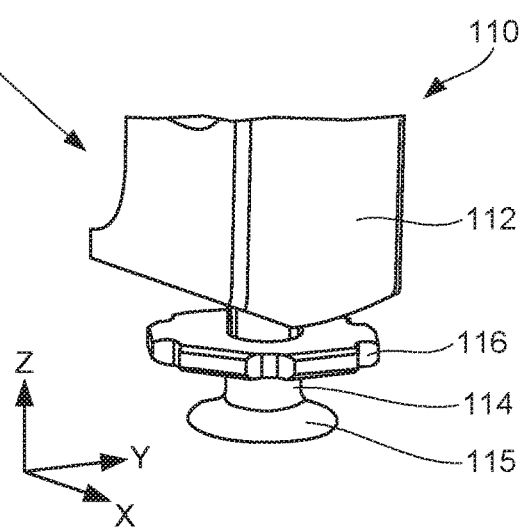
FIG. 1D illustrates a bottom portion of the passenger seat, in accordance with some examples.

FIG. 1D illustrates a bottom portion of seat 110. This bottom portion is used for attaching seat 110 to a seat track or, more specifically, for attaching directly to different-type seat track 130 shown in FIG. 1F. This direct attachment is shown in FIG. 1G and further described below with reference to this figure. However, the bottom portion of seat 110 shown in FIG. 1D cannot be directly attached to seat track 190 shown in FIG. 1E. While a different type of seats may be used and directly attached to seat track 190, stocking different types of seats is challenging to aircraft operators.

Referring to FIG. 1D, seat 110 comprises leg 112 and stud 114. Stud 114 is connected to the end of leg 112 and terminates with stud end 115. Stud end 115 may shaped as a disk, which has a diameter larger than that of stud 114. In some examples, stud 114 has a thread, threadably engaging stud nut 116. Stud end 115 is configured to be inserted and engage either a seat track directly or using a seat track fitting as further described below.

Figure 1E:
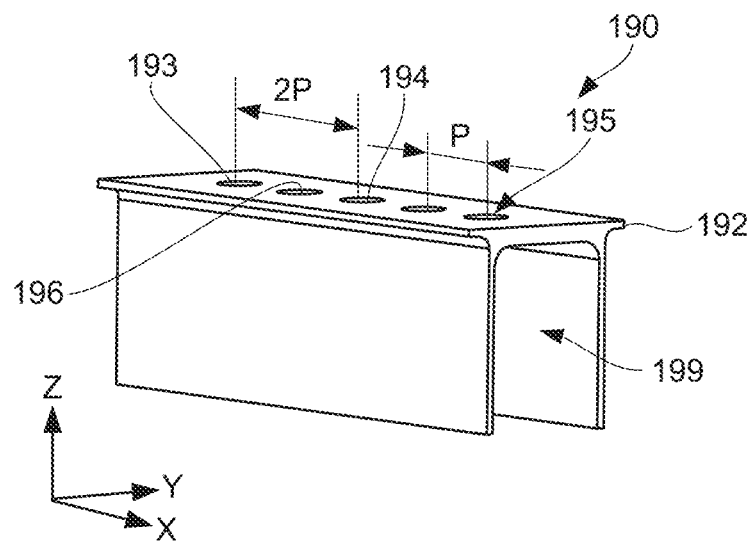
FIGS. 1E and 1F illustrate two examples of seat tracks used in aircraft for supporting passenger seats.

FIG. 1E illustrates one example of seat track 190. Seat track 190 comprises track support 192 for receiving a seat leg and, in some examples, supporting floor panels. Track support 192 has a planar surface and comprises multiple attachment openings 195. A pair of two adjacent attachment openings 195 is separated by a seat track pitch (P), which should be distinguished from the seat pitch (SP) described above. The seat track pitch (P) represents an increment by which the seat pitch (SP) can be changed. In some embodiments, additional adjustment to the seat pitch is provided by seat track fittings, as further described below with reference to FIG. 2C.

Not all attachment openings 195 are used for attaching to a seat or to a seat track fitting. For example, FIG. 1E identifies first attachment opening 193 and second attachment opening 194, which are used for attaching a seat track fitting and which will be further described below with reference to FIGS. 3, 4A, and 4B. An additional opening, i.e., third attachment opening 196, is disposed between first attachment opening 193 and second attachment opening 194. As such, first attachment opening 193 and second attachment opening 194 are separated by double the seat pitch (SP). One having ordinary skill in the art would appreciate that seat 110 of FIGS. 1C and 1D cannot be attached directly to seat track 190 of FIG. 1E. Instead, a seat track fitting is used for this purpose as further described below.

Figure 1F:
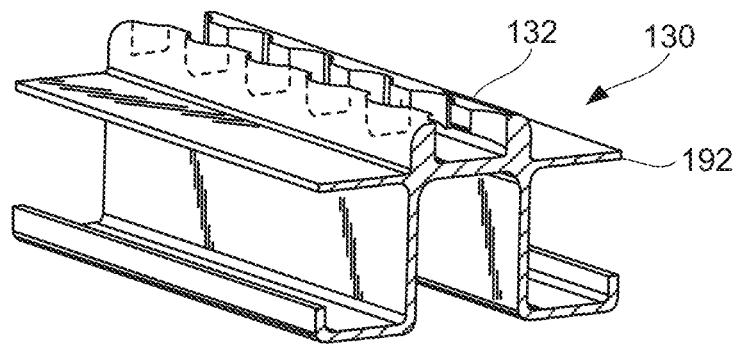
Figure 1G:
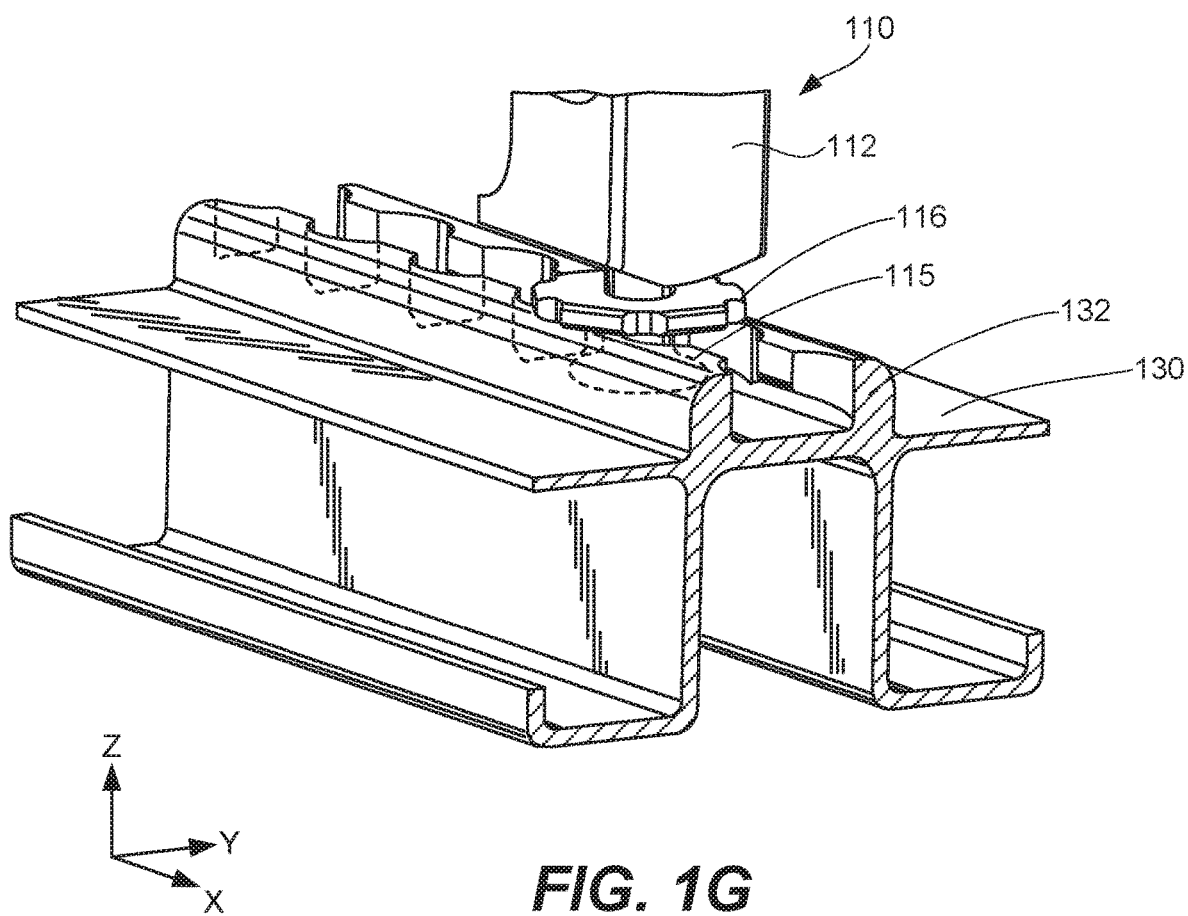
FIG. 1G illustrates the passenger seat of FIG. 1D attached to and supported by the seat track of FIG. 1F, in accordance with some examples.

FIG. 1F illustrates different-type seat track 130, which is designed for direct attachment to seat 110 of FIGS. 1C and 1D. Different-type seat track 130 also comprises track support 192. However, instead of attachment openings, different-type seat track 130 comprises protrusion 132 extending above track support 192. Protrusion 132 is used to receive stud end 115 as, for example, shown in FIG. 1G, and secure leg 112 when stud nut 116 is tightened against protrusion 132. A seat track fitting is not needed for attachment of seat 110 to different-type seat track 130. It should be noted that some aircraft of an aircraft operator may be equipped with seat track 190 shown in FIG. 1E, while other aircraft may be equipped with different-type seat track 130 shown in FIG. 1F.

Examples of Seat Track Fitting

Figure 2A:
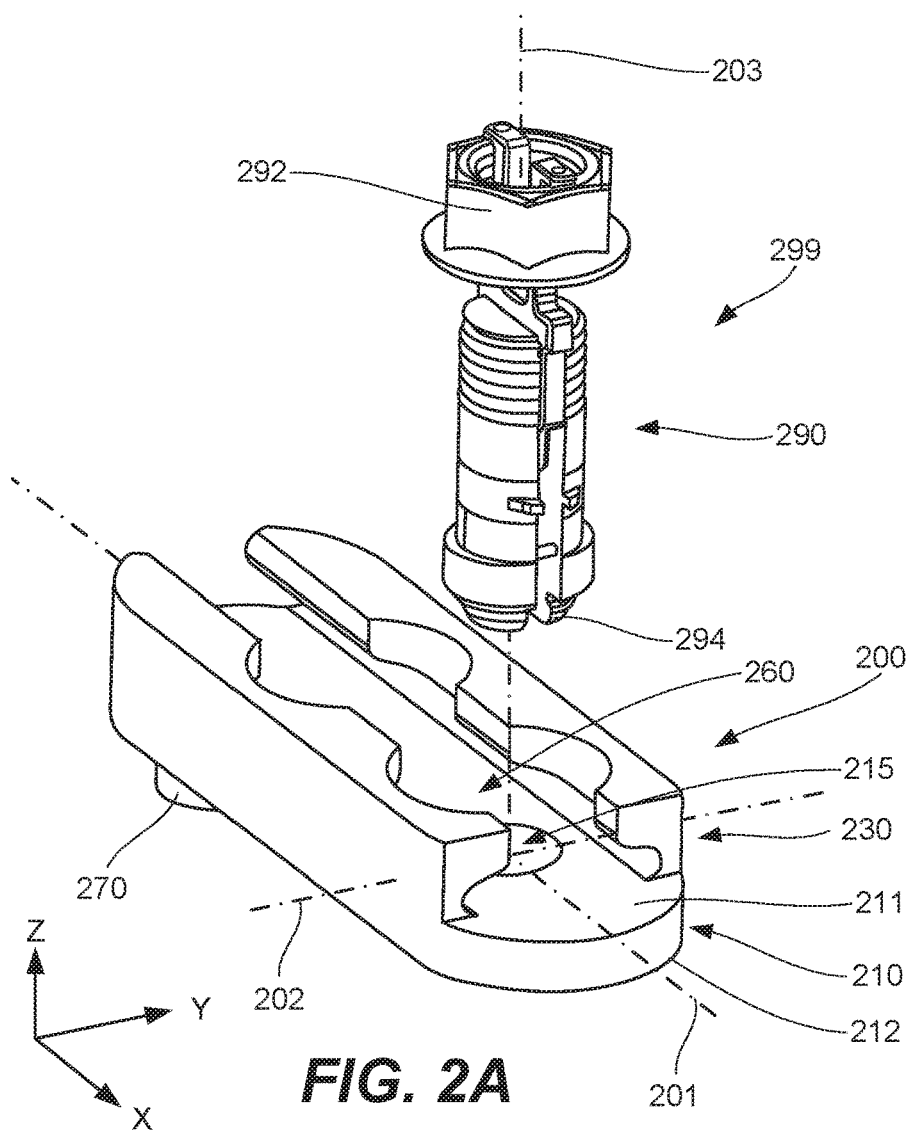
FIG. 2A is a top perspective view of a seat track fitting and a corresponding removable fastener used for securing the seat track fitting on a seat track, in accordance with some examples.

FIGS. 2A-2D illustrate seat track fitting 200, in accordance with some embodiments. Seat track fitting 200 is configured for attaching to seat track 190, shown in FIG. 1E, and to seat 110 of FIGS. 1C and 1D and interconnect seat track 190 to seat 110. As shown in FIG. 2A, in some examples, seat track fitting 200 is a part of seat track fitting kit 299. Seat track fitting kit 299 also comprises removable fastener 290 for attaching seat track fitting 200 to seat track 190. The overall process of installing seat 110 on seat track 190 using seat track fitting 200 is described below with reference to FIG. 3 as well as FIGS. 4A-4B.

Referring to FIG. 2A, seat track fitting 200 has, and is defined with respect to, first axis 201, second axis 202, and third axis 203. First axis 201 is perpendicular to each of second axis 202 and third axis 203. Second axis 202 is also perpendicular to third axis 203. Furthermore, first axis 201 is parallel to the X direction identified in various figures, second axis 202 is parallel to the Y direction, and third axis 203 is parallel to the Z direction. The X, Y, and Z directions are described above with reference to aircraft 1402. It should be noted that various forces are applied to seat track fitting 200 along the X, Y, and Z directions during operation of aircraft 1402.

Seat track fitting 200 comprises base 210, leg support 230, and pin 270. Base 210 interconnects leg support 230 and pin 270. Furthermore, in some examples, base 210, leg support 230, and pin 270 are monolithic (e.g., formed from a same block of material). The monolithic aspect ensures mechanical performance of seat track fitting 200, while allowing keeping the size of seat track fitting 200 rather small (e,g., not to impact the height of seat 110 relative to the floor). Various materials are suitable for seat track fitting 200, such as aluminum, titanium, steel, carbon-fiber composites, and the like. In general, the materials for seat track fitting 200 are lightweight yet mechanically strong, which are key considerations for aircraft applications.

Figure 2B:
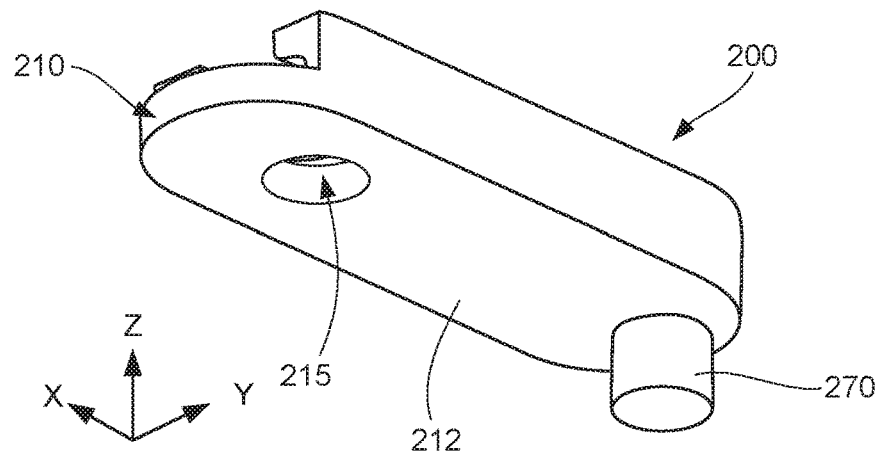
FIG. 2B is a bottom perspective view of the seat track fitting of FIG. 2A, illustrating the pin extending from the second planar surface of the seat track fitting, in accordance with some examples.

Referring to FIGS. 2A and 2B, base 210 comprises first planar surface 211, second planar surface 212, and base opening 215. In some examples, first planar surface 211 is parallel to second planar surface 212. More specifically, first planar surface 211 is offset relative to second planar surface 212 along third axis 203 of seat track fitting 200. The distance between first planar surface 211 and second planar surface 212 may be referred to as a thickness of base 210. As noted above, the thickness should be relatively small to avoid an excessive increase in height of the seat above the floor. On the other hand, base 210 has to maintain the position of leg support 230 relative to the seat track.

First axis 201 and second axis 202 are defined such that first axis 201 and second axis 202 pass through first planar surface 211. In other words, first planar surface 211 coincides with a virtual plane formed by first axis 201 and second axis 202.

Base opening 215 is a through hole and extends between first planar surface 211 and second planar surface 212. Base opening 215 is centered relative to third axis 203 of seat track fitting 200. Furthermore, first axis 201 and second axis 202 extend through the center of base opening 215. In other words, all three axes (i.e., first axis 201, second axis 202, and third axis 203) pass through the same point. Base opening 215 has a cylindrical shape or, more specifically, the shape of a round cylinder or a circular cylinder.

During installation of seat track fitting 200 on seat track 190, removable fastener 290 protrudes through base opening 215 and forces first planar surface 211 toward seat track 190. The diameter of base opening 215 is selected based on the diameter of removable fastener 290 (e.g., to ensure clearance fit).

Figure 2C:
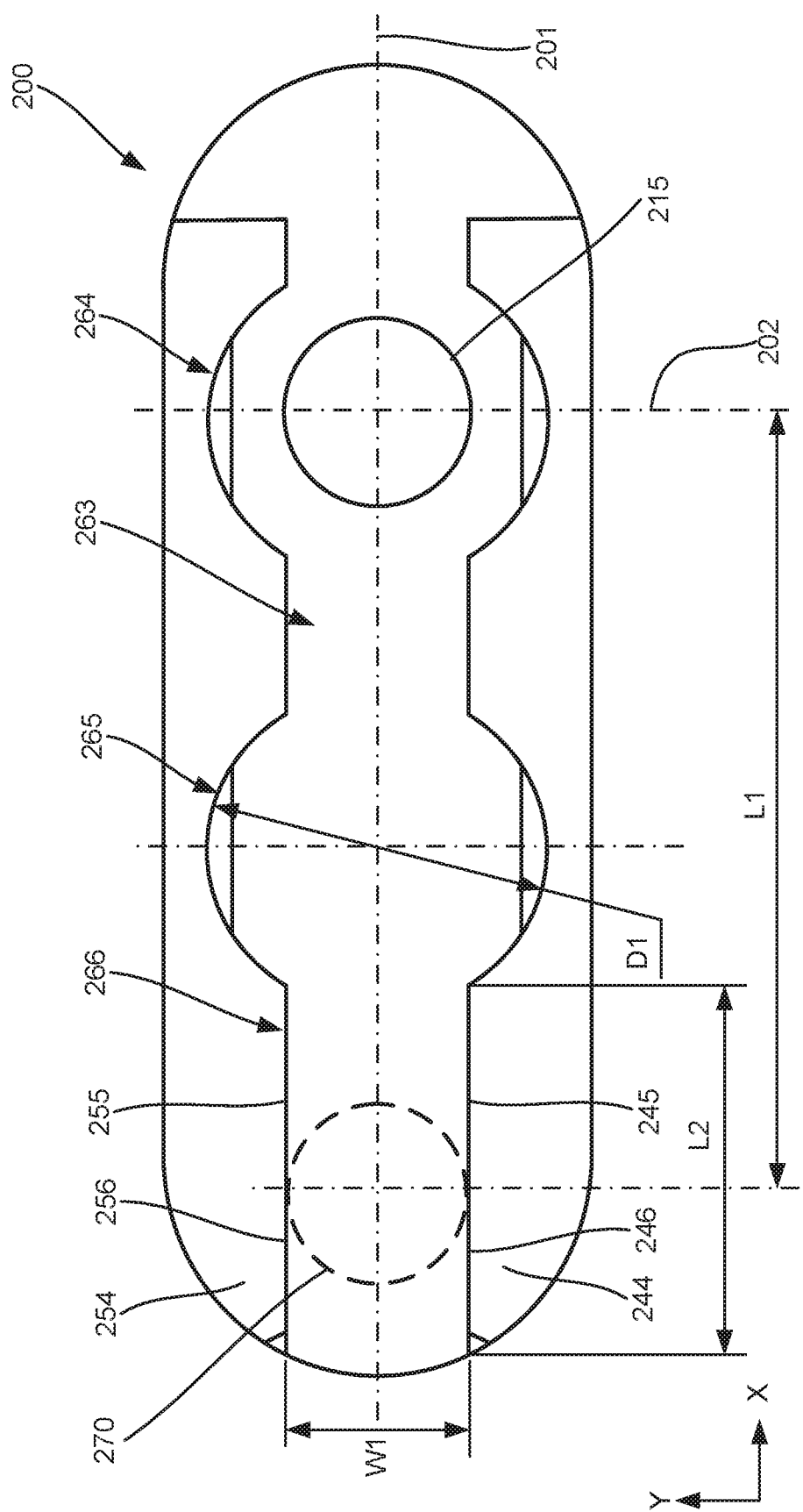
FIG. 2C is a top view of the seat track fitting of FIG. 2A, illustrating various features of the support opening of the seat track fitting, in accordance with some examples.
Figure 2D:
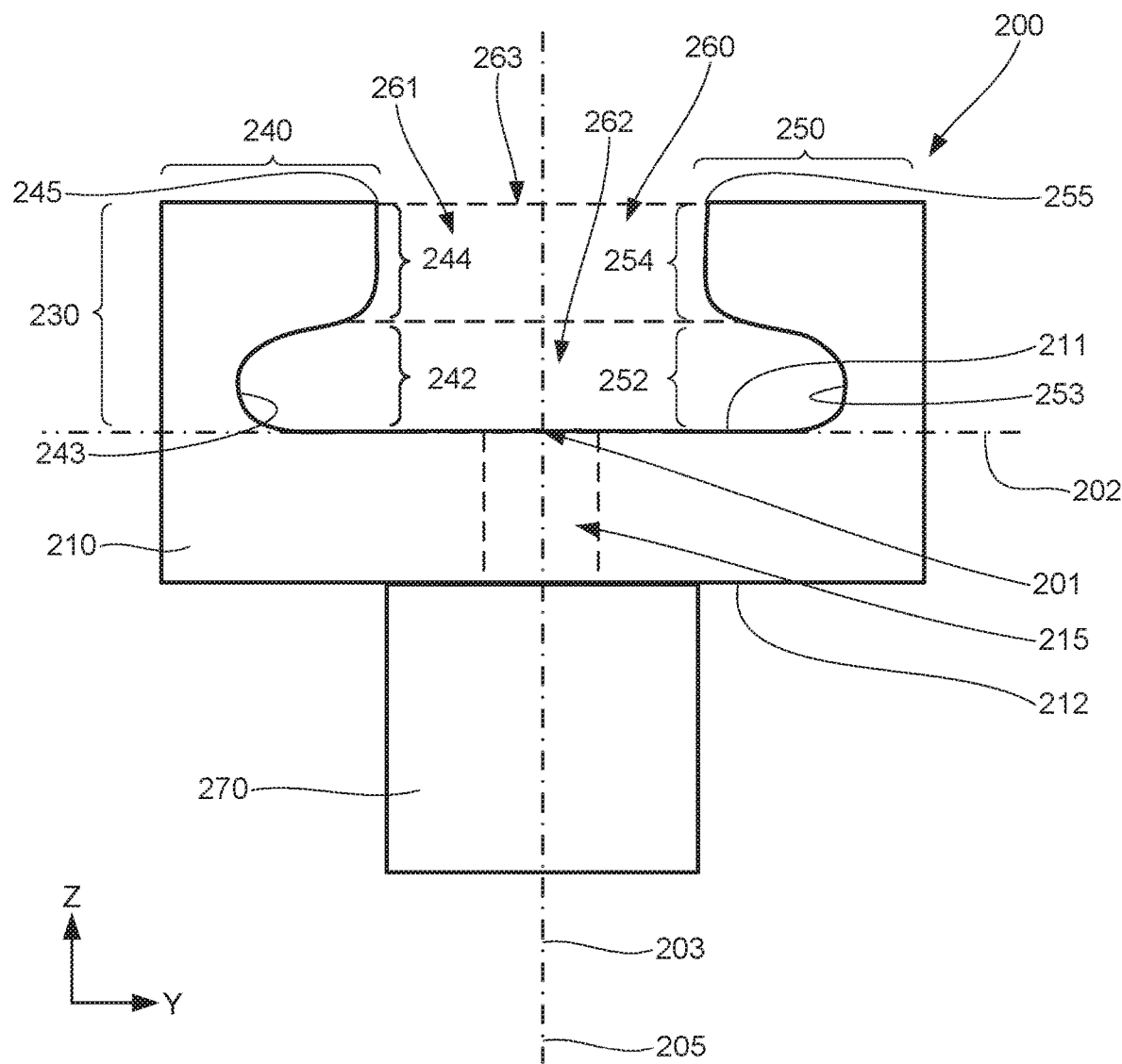
FIG. 2D is a front view of the seat track fitting of FIG. 2A, illustrating a channel for receiving a stud end of the passenger seat of FIG. 1A and a fastener nut of the removable fastener, in accordance with some examples.

Referring to FIG. 2D, leg support 230 comprises first leg support portion 240 and second leg support portion 250. Collectively, first leg support portion 240 and second leg support portion 250 form channel 260 over first planar surface 211 of base 210. Channel 260 extends along first axis 201, as more clearly seen in FIG. 2A. Channel 260 is used for receiving removable fastener 290 during installation of seat track fitting 200 on seat track 190. Furthermore, during installation of seat 110, channel 260 is used for receiving stud end 115 of seat 110 and sliding stud end 115 within channel 260 along first axis 201 as further described below with reference to FIG. 3.

Referring to FIG. 2D, first leg support portion 240 comprises first lip 244 and first wall 242. First wall 242 is monolithic with first lip 244 to base 210 and connects first lip 244 to base 210. Similarly, second leg support portion 250 comprises second lip 254 and second wall 252. Second wall 252 is monolithic with second lip 254 to base 210 and connects second lip 254 to base 210.

Referring to FIG. 2D, channel 260 comprises first channel portion 261, second channel portion 262, and support opening 263. First channel portion 261 is positioned between first lip 244 and second lip 254 along second axis 202. Second channel portion 262 is positioned between first wall 242 and second wall 252 along second axis 202. Furthermore, second channel portion 262 is positioned between first channel portion 261 and first planar surface 211 along third axis 203. Without implying any orientation of seat track fitting 200, first channel portion 261 may be referred to as a top channel portion, while second channel portion 262 may be referred to as a bottom channel portion.

Referring to FIG. 2D, second channel portion 262 is wider (in the direction along second axis 202) than first channel portion 261. In some examples, the cross-sectional shape of second channel portion 262, shown in FIG. 2D, conforms to the cross-sectional shape of stud end 115 and is constant along first axis 201. The cross-sectional shape of first channel portion 261 is variable along first axis 201, as further described above with reference to FIG. 2C.

Support opening 263 is defined by first inner lip edge 245 of first lip 244 and second inner lip edge 255 of second lip 254. Furthermore, support opening 263 is a part of the boundary of first channel portion 261. During installation of seat 110, stud end 115 enters channel 260 through support opening 263 or, more specifically, through specific portions of support opening 263 as further described below with reference to FIG. 2C.

Referring to FIGS. 2B and 2D, in some examples, pin 270 is monolithic with base 210. Pin 270 extends from second planar surface 212, along third axis 203 and away from first planar surface 211. During installation of seat track fitting 200 on seat track 190, pin 270 is inserted into one of attachment openings 195 of seat track 190. As such, the diameter of pin 270 depends on the diameter of attachment openings 195 to ensure clearance fit. Pin 270 has a cylindrical shape or, more specifically, the shape of a round cylinder or a circular cylinder.

Figure 3:
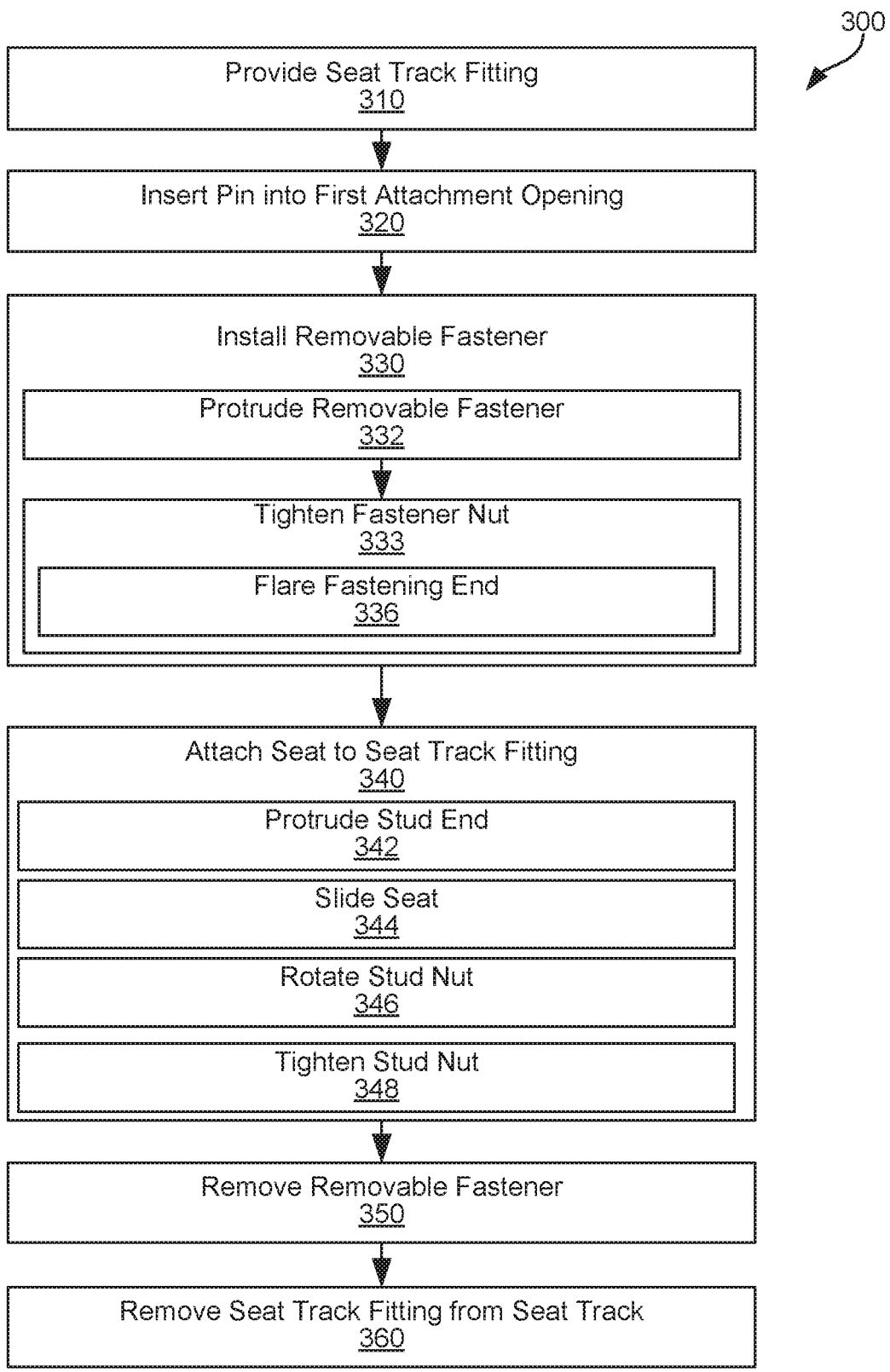
FIG. 3 is a process flowchart corresponding to a method for installing a passenger seat on a seat track in an aircraft cabin using a seat track fitting, in accordance with some examples.
Figure 4A:
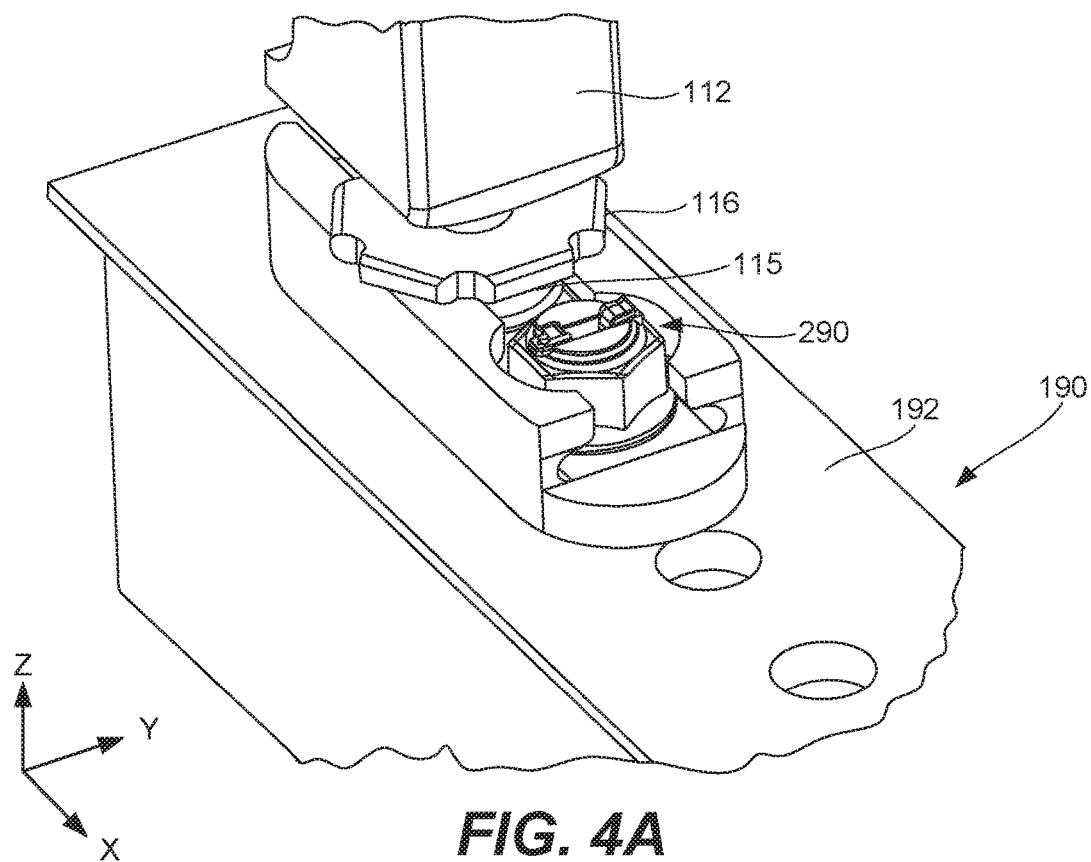
FIG. 4A is a top perspective view of a passenger seat attached to a seat track using a seat track fitting, in accordance with some examples.
Figure 4B:
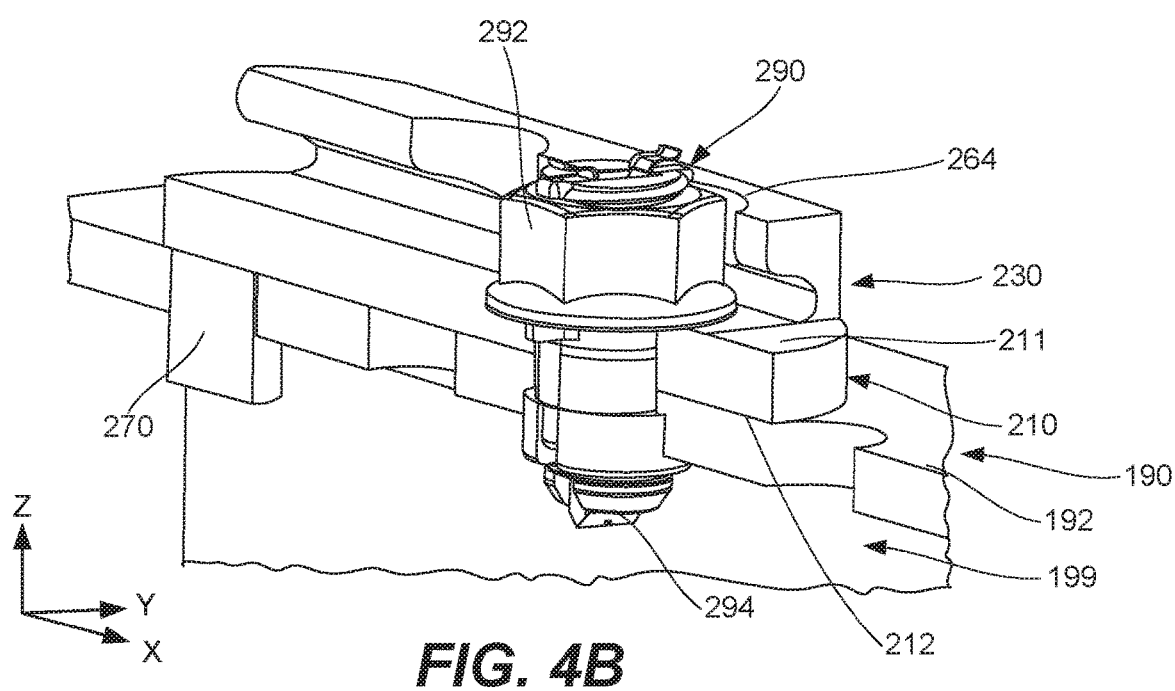
FIG. 4B is a cross-sectional view of the seat track fitting attached to the seat track, in accordance with some examples.
Figure 5:
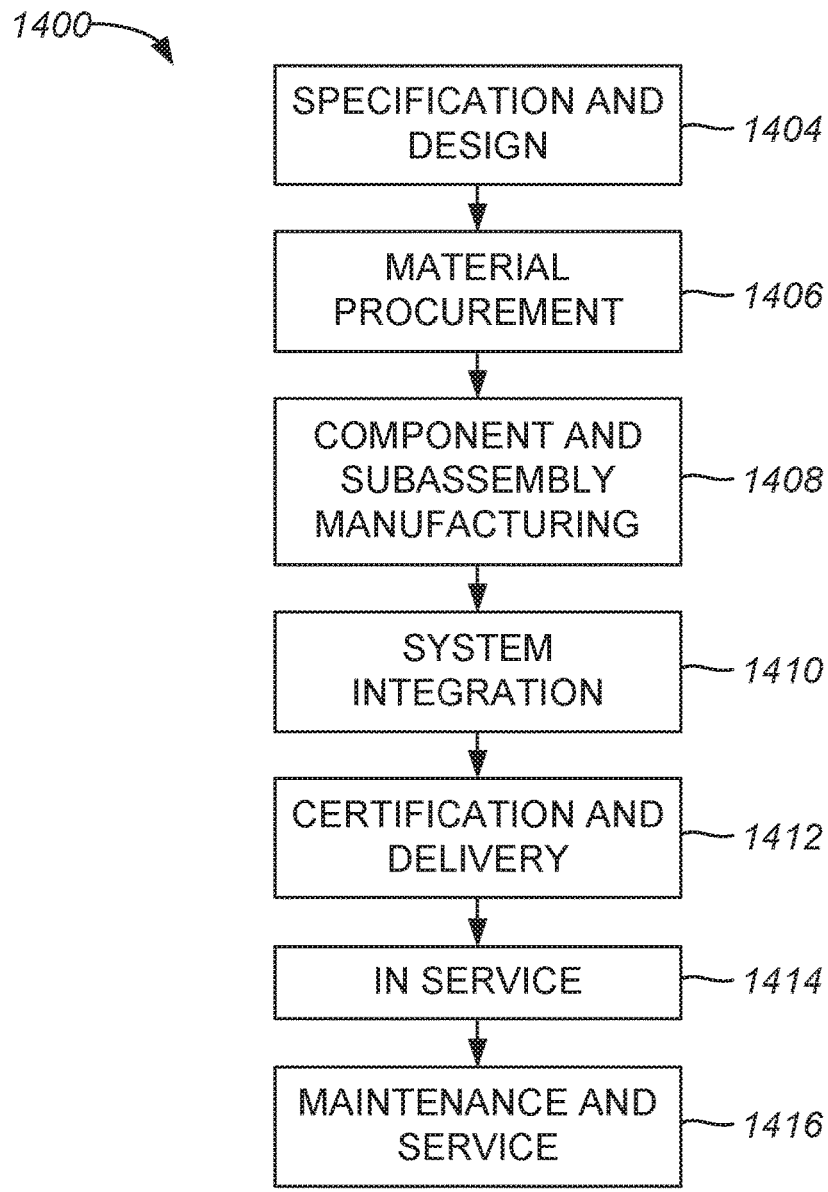
FIG. 5 is a process flowchart corresponding to a method for manufacturing and service the aircraft.

Referring to FIGS. 2C and 4B, in some examples, the center distance (L1) between pin 270 and base opening 215 is equal to double of the seat track pitch (P). This distance ensures that both pin 270 and base opening 215 are aligned with corresponding attachment openings 195 of seat track 190, such as first attachment opening 193 and second attachment opening 194 shown in FIG. 1E. In other words, during installation of seat track fitting 200 on seat track 190, pin 270 and removable fastener 290, protruding through base opening 215, are inserted into these attachment openings as further described below with reference to FIG. 3. This center distance (L1) ensures a relatively compact design of seat track fitting 200 while providing sufficient support, especially along first axis 201.

Referring to FIG. 2C, in some examples, support opening 263 comprises first semicircular portion 264 and second semicircular portion 265. First semicircular portion 264 is concentric with base opening 215 and is used for installation of removable fastener 290, which at least partially protrudes through base opening 215. Second semicircular portion 265 is used for receiving stud end 115 of seat 110 or, more specifically, allowing stud end 115 to protrude into second channel portion 262.

Furthermore, in some examples, support opening 263 comprises linear portion 266 defined by first linear part 246 of first inner lip edge 245 and also defined by second linear part 256 of second inner lip edge 255. Each of first linear part 246 and second linear part 256 is parallel to first axis 201. During installation of seat 110, stud end 115 protrudes through second semicircular portion 265 and, while being positioned within second channel portion 262, slides within second channel portion 262 into a space under linear portion 266. As such, when installation of seat 110 is completed, stud 114 of seat 110 protrudes through linear portion 266 of support opening 263. As noted above, the diameter of stud 114 is smaller than the diameter of stud end 115. Once stud end 115 is slid within second channel portion 262 into a space under linear portion 266, stud end 115 can no longer be retracted from second channel portion 262.

Linear portion 266 has a width (W1), which is smaller than the diameter (D1) of second semicircular portion 265. Specifically, the width (W1) of linear portion 266 may be larger than the diameter of stud 114 (e.g., to ensure clearance fit), but smaller than the diameter of stud end 115. The diameter (D1) of second semicircular portion 265 is larger than the diameter of stud end 115 (e.g., to ensure clearance fit). In some examples, the diameter (D1) of second semicircular portion 265 is the same as that of first semicircular portion 264.

Overall, during installation, stud end 115 of seat 110 protrudes through second semicircular portion 265 and is positioned in second channel portion 262. Once seat 110 is slid along first axis 201 and stud end 115 is positioned under linear portion 266, stud end 115 can no longer be extracted from second channel portion 262. Stud end 115 is positioned between first planar surface 211 and the combination of first lip 244 and of second lip 254. In this position, stud end 115 can no longer move along third axis 203.

Referring to FIG. 2C, in some examples, linear portion 266 has a length (L2) that is larger than the diameter (D1) of second semicircular portion 265. This length (L2) of linear portion 266 ensures that first lip 244 and second lip 254 provide sufficient support and engagement surfaces for stud end 115 when seat 110 is installed on seat track 190 using seat track fitting 200. Furthermore, the length (L2) also ensures fine tuning of the seat pitch. In other words, the length (L2) allows positioning stud 114 at multiple locations along the length (L2).

Referring to FIG. 2C, in some examples, second semicircular portion 265 is positioned between first semicircular portion 264 and linear portion 266 along first axis 201. As such, when stud end 115 is inserted through second semicircular portion 265, stud end 115 is slid (along first axis 201) away from first semicircular portion 264 (and removable fastener 290 installed through first semicircular portion 264). In other words, removable fastener 290 prevents stud end 115 from sliding in another direction.

Referring to FIG. 2D, in some examples, first wall 242 comprises first inner curved wall 243, while second wall 252 comprises second inner curved wall 253. First inner curved wall 243 and second inner curved wall 253, together with first planar surface 211 and first channel portion 261, define the boundary of second channel portion 262. After installation of seat 110, stud end 115 stays within this boundary. Furthermore, in some examples, first inner curved wall 243 and second inner curved wall 253 are conformal to the shape of stud end 115, thereby preventing movement of stud end. 115 with second channel portion 262 along second axis 202.

In some examples, each of first inner curved wall 243 and second inner curved wall 253 is parallel to first axis 201. As such, the cross-sectional shape of second channel portion 262 within any plane perpendicular to first axis 201 is constant. This feature allows stud end 115 to slide within second channel portion 262 and be supported within second channel portion 262 at multiple different locations along first axis 201.

Referring to FIG. 2D, in some examples, first leg support portion 240 and second leg support portion 250 are symmetrical relative to a virtual plane 205 containing first axis 201 and third axis 203. Furthermore, support opening 263 is parallel to first planar surface 211. The average width of first channel portion 261, along second axis 202, is smaller than an average width of second channel portion 262. The maximum width of first channel portion 261, along second axis 202, is equal to the maximum width of second channel portion 262. Finally, each of first channel portion 261 and second channel portion 262 extends, along first axis 201, an entire length of seat track fitting 200.

Examples of Seat Installation Methods

FIG. 3 illustrates a process flowchart corresponding to method 300 of installing seat 110 on seat track 190. Method 300 utilizes seat track fitting 200, various examples of which are described above with reference to FIGS. 2A-2D. Specifically, method 300 commences with providing seat track fitting 200 (block 310 in FIG. 3). Seat track fitting 200 comprises base 210, leg support 230, and pin 270, in some examples, having various features described above.

Method 300 proceeds with inserting pin 270 of seat track fitting 200 into first attachment opening 193 of seat track 190 (block 320). First attachment opening 193 is selected based on the desired position of seat 110 on seat track 190 or, more generally, the desired position of seat 110 in cabin 100 of aircraft 1402. In some examples, first attachment opening 193 is positioned at a distance equal to the seat pitch from another attachment opening, which has already received or will receive a pin of another seat track fitting. In some examples, first attachment opening 193 is identified using marking on seat track 190, one or more references in the aircraft cabin, or the like.

Method 300 may proceed with installing removable fastener 290 through second attachment opening 194 of seat track 190 and through base opening 215 of seat track fitting 200 (block 330). FIG. 4B illustrates a processing stage after the installation of removable fastener 290. A part of removable fastener 290 protrudes through base 210 of seat track fitting 200 and also through track support 192 of seat track 190. Another part of removable fastener 290, e.g., end 294, extends into track channel 199 and may flare within channel 199 after the installation is complete. Yet another part of removable fastener 290 extends into channel 260 of leg support 230. After this installation, removable fastener 290 forces second planar surface 212 of base 210 of seat track fitting 200 toward track support 192.

Various examples of removable fastener 290 are within the scope, such as Harper Engineering Part Number H3-1904-1. Using removable fastener 290, rather than a permanent fastener, allows repositioning seat track fitting 200 at a new location. Furthermore, it should be noted that installing removable fastener 290 (block 330) is performed after inserting pin 270 of seat track fitting 200 into first attachment opening 193 of seat track 190. As such, pin 270 provides alignment of seat track fitting 200 on seat track 190, thereby simplifying the installing of removable fastener 290.

In some examples, support opening 263 comprises first semicircular portion 264, concentric with base opening 215. In these examples, installing removable fastener 290 (block 330) comprises protruding removable fastener 290 through first semicircular portion 264, base opening 215, and second attachment opening 194 (block 332). A part of removable fastener 290 extends into track channel 199. Installing removable fastener 290 (block 330) also comprises tightening fastener nut 292 of removable fastener 290 against first planar surface 211 (block 333). In some examples, tightening fastener nut 292 causes end 294 of removable fastener 290, which extends into track channel 199, to flare (block 336). After this operation, removable fastener 290 cannot be extracted from second attachment opening 194, at least not without loosening fastener nut 292. Furthermore, this feature allows installing removable fastener 290 from the side of seat track fitting 200 without a need for accessing track channel 199 (e.g., accessing under the floor). In some examples, after this operation, most of fastener nut 292 is positioned within channel 260. A portion of removable fastener 290 may protrude above seat track fitting 200.

In some examples, method 300 further comprises attaching seat 110 to seat track fitting 200, supported on seat track 190 (block 340). In some examples, this seat attachment operation is performed after attaching seat track fitting 200 to seat track 190. Alternatively, seat 110 is attached to seat rack fitting 200 prior to attaching seat track fitting 200 to seat track 190.

In some examples, attaching seat 110 to seat track fitting 200 (block 340) comprises protruding stud end 115 of seat 110 into second channel portion 262 (block 342), sliding seat 110 along first axis 201 of seat track fitting 200 (block 344), rotating stud nut 116 of seat 110 relative to stud 114 (block 346), and tightening stud nut 116 against first lip 244 and second lip 254 (block 348). FIG. 4A illustrates a processing stage during these operations or, more specifically, after protruding stud end 115 of seat 110 into second channel portion 262.

As described above, stud 114 connects stud end 115 and leg 112 of seat 110. Once stud end 115 of seat 110 is inserted into second channel portion 262, stud 114 protrudes through first channel portion 261. Furthermore, after stud nut 116 is tightened, each of first lip 244 and second lip 254 of leg support 230 is disposed and tightened between stud nut 116 and stud end 115, thereby preventing stud 114 and other elements of seat 110 from moving along second axis 202.

Referring briefly to FIG. 2C, in some examples, support opening 263 comprises second semicircular portion 265. In these examples, stud end 115 protrudes into second channel portion 262 through second semicircular portion 265. As noted above, the diameter (D1) of second semicircular portion 265 is larger than the width (W1) of linear portion 266. This allows stud end 115 to protrude into second channel portion 262, through second semicircular portion 265, and then slide within second channel portion 262 to an area under linear portion 266. More specifically, stud end 115 is slid within second channel portion 262 in the direction away from removable fastener 290. As such, removable fastener 290 does not interfere with installation of seat 110, even though a portion of removable fastener 290 extends into channel 260.

In some examples, method 300 further comprises removing removable fastener 290 from second attachment opening 194 of seat track 190 and through base opening 215 of seat track fitting 200 (block 350) and removing seat track fitting 200 from seat track 190 (block 360). These operations can be repeated multiple times, e.g., for new locations of seat 110.

Aircraft and Spacecraft Examples

As discussed above, various examples of seat track fitting 200 disclosed herein are used on aircraft 1402. Accordingly, the manufacture of such appliances may be described in the context of an aircraft manufacturing and service method 1400 as shown in FIG. 8 and aircraft 1402 as shown in FIG. 9. During pre-production, method 1400 may include specification and design 1404 of aircraft 1402 and material procurement 1406. During production, component and subassembly manufacturing stages 1408 and system integration stage 1410 of aircraft 1402 takes place. Thereafter, aircraft 1402 may go through certification and delivery 1412 in order to be placed in service 1414. While in service by a customer, aircraft 1402 is scheduled for routine maintenance and service 1416 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, aircraft 1402 produced by method 1400 may include an airframe 1418 with high-level systems 1420 and interior 1422, which includes cabin 100, schematically shown in FIG. 4. Examples of high-level systems 1420 include one or more of a propulsion system 1424, an electrical system 1426, a hydraulic system 1428, and an environmental system 1430. Although an aerospace example is shown, the principles of the examples described herein may be applied to other industries.

Devices and methods embodied herein may be employed during any one or more of the stages of method 1400. For example, components or subassemblies corresponding to stages 1408 and 1410 may be fabricated or manufactured in a manner similar to components or subassemblies produced while aircraft 1402 is in service. Also, one or more device examples, method examples, or a combination thereof may be utilized during stages 1408 and 1410, for example, by substantially expediting assembly of or reducing the cost of aircraft 1402. Similarly, one or more of device examples, method examples, or a combination thereof may be utilized while aircraft 1402 is in service, for example and without limitation, for maintenance and service 1416.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for installing a seat on a seat track in an aircraft cabin, the method comprising:
   providing a seat track fitting, having a first axis and comprising a base, a leg support, and a pin, wherein:
      the base comprises a first planar surface, a second planar surface, and a base opening, having a circular cross-section;
      the leg support comprises a first leg support portion and a second leg support portion, forming a channel over the first planar surface of the base and comprising a support opening;
      the support opening comprises a first semicircular portion, concentric with the base opening; and
      the pin is monolithic with the base and extends from the second planar surface away from the leg support;
   inserting the pin of the seat track fitting into a first attachment opening of the seat track; and installing a removable fastener through a second attachment opening of the seat track and through the base opening of the seat track fitting by protruding the removable fastener through the first semicircular portion, the base opening, and the second attachment opening and tightening a fastener nut of the removable fastener against the first planar surface, wherein:
  the removable fastener forces the second planar surface of the base of the seat track fitting toward a track support of the seat track, and
  a portion of the removable fastener extends within and blocks the first semicircular portion.

2. The method of claim 1, wherein tightening the fastener nut against the first planar surface comprises flaring an end of the removable fastener inside a track channel of the seat track.

3. The method of claim 1, wherein at least a portion of the fastener nut is positioned within the channel.

4. The method of claim 1, further comprising attaching the seat to the seat track fitting, supported on the seat track.

5. The method of claim 4, wherein the attaching the seat to the seat track fitting comprises:
  protruding a stud end of the seat into the channel;
  sliding the seat along the first axis of the seat track fitting;
  rotating a stud nut of the seat relative to a stud, connecting the stud end and a leg of the seat; and
  tightening the stud nut against a first lip of the first leg support portion and a second lip of the second leg support portion, wherein the first lip and the second lip are disposed and tightened between the stud nut and the stud end.

6. The method of claim 5, wherein:
  the support opening comprises a second semicircular portion; and
  the stud end is protruded into the channel through the second semicircular portion.

7. The method of claim 6, wherein:
  the support opening comprises a linear portion defined by a first linear part of a first inner lip edge of the first lip and by a second linear part of a second inner lip edge of the second lip; and
  after sliding the seat along the first axis, the stud protrudes through the linear portion.

8. The method of claim 7, wherein the first linear part and the second linear part are both parallel to the first axis.

9. The method of claim 7, wherein
  the linear portion has a width (W1) less than a diameter (D1) of the second semicircular portion; and
  the linear portion has a length (L2) greater than the diameter (D1) of the second semicircular portion.

10. The method of claim 7, wherein the second semicircular portion is positioned between the first semicircular portion and the linear portion along the first axis.

11. The method of claim 5, wherein sliding the seat along the first axis comprising sliding the stud end within the channel in a direction away from the removable fastener.

12. The method of claim 5, wherein:
  the first leg support portion comprises a first inner curved wall, monolithic with and connecting the first lip to the base; and
  the second leg support portion comprises a second inner curved wall, monolithic with and connecting the second lip to the base.

13. The method of claim 12, wherein shapes of the first inner curved wall and the second inner curved wall are conformal to a shape of a stud end of the seat.

14. The method of claim 12, wherein the first inner curved wall and the second inner curved wall are both parallel to the first axis.

15. The method of claim 1, further comprising:
  removing the removable fastener from the second attachment opening of the seat track and through the base opening of the seat track fitting; and
  removing the seat track fitting from the seat track.

16. The method of claim 15, wherein removing the removable fastener is performed while the seat is attached to the seat track fitting.

17. The method of claim 1, wherein the pin of the seat track fitting is inserted into the first attachment opening of the seat track before installing the removable fastener through the second attachment opening of the seat track and through the base opening of the seat track fitting such that the pin provides alignment of the seat track fitting relative to the seat track while installing the removable fastener through the second attachment opening of the seat track and through the base opening.

18. The method of claim 1, wherein installing the removable fastener through the second attachment opening of the seat track and through the base opening of the seat track fitting is performed without accessing a tack channel of the seat track.

19. The method of claim 1, wherein an additional portion of the removable fastener extends above the seat track fitting and away from the seat track.

20. The method of claim 1, further comprising attaching the seat to the seat track fitting before inserting the pin of the seat track fitting into the first attachment opening of the seat track and also before installing the removable fastener through the second attachment opening of the seat track and through the base opening of the seat track fitting.

21. The method of claim 1, wherein the seat track fitting comprises a carbon-fiber composite.

22. The method of claim 1, wherein the first attachment opening is identified with a marking on the seat track.

23. A method comprising:
  providing a seat track fitting comprising a base, a leg support, and a pin, wherein:
    the base comprises a base opening, having a circular cross-section,
    the leg support comprises a first leg support portion and a second leg support portion, forming a channel over the base and comprising a support opening, and
    the support opening comprises a first semicircular portion, concentric with the base opening;
  inserting the pin of a seat track fitting into a first attachment opening of a seat track;
  installing a removable fastener through a second attachment opening of the seat track and through the base opening of the seat track fitting by protruding the removable fastener through the first semicircular portion, the base opening, and the second attachment opening and tightening a fastener nut of the removable fastener against the base, wherein the removable fastener forces the base of the seat track fitting toward the seat track, and wherein a portion of the removable fastener extends within and blocks the first semicircular portion; and
  attaching a seat to the seat track fitting, supported on the seat track.

24. A method comprising:
  providing a seat track fitting comprising a base, a leg support, and a pin, wherein:

the base comprises a base opening, having a circular cross-section, the leg support comprises a first leg support portion and a second leg support portion, forming a channel over the base and comprising a support opening, and the support opening comprises a first semicircular portion, concentric with the base opening;

inserting the pin of a seat track fitting into a first attachment opening of a seat track;

installing a removable fastener through a second attachment opening of the seat track and through the base opening of the seat track fitting by protruding the removable fastener through the first semicircular portion, the base opening, and the second attachment opening and tightening a fastener nut of the removable fastener against the base, wherein the removable fastener forces the base of the seat track fitting toward the seat track, and wherein a portion of the removable fastener extends within and blocks the first semicircular portion;

removing the removable fastener from the second attachment opening of the seat track and through the base opening of the seat track fitting; and removing the seat track fitting from the seat track.

* * * * *